United States Patent
Kono

(10) Patent No.: US 11,760,131 B2
(45) Date of Patent: Sep. 19, 2023

(54) MOTORCYCLE TIRE PAIR

(71) Applicant: SUMITOMO RUBBER INDUSTRIES, LTD., Kobe (JP)

(72) Inventor: Kyosuke Kono, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/577,636

(22) Filed: Jan. 18, 2022

(65) Prior Publication Data

US 2022/0258538 A1 Aug. 18, 2022

(30) Foreign Application Priority Data

Feb. 18, 2021 (JP) ................................. 2021-024276

(51) Int. Cl.
*B60C 9/22* (2006.01)
*B60C 9/00* (2006.01)

(52) U.S. Cl.
CPC .............. *B60C 9/22* (2013.01); *B60C 9/0007* (2013.01); *B60C 2009/2238* (2013.01); *B60C 2200/10* (2013.01)

(58) Field of Classification Search
CPC ............................... B60C 2200/10; B60C 9/22
See application file for complete search history.

(56) References Cited

U.S. PATENT DOCUMENTS

| 4,510,983 A | 4/1985 | Ohkuni et al. |
| 4,966,215 A | 10/1990 | Oka |
| 2007/0158008 A1 | 7/2007 | Nakamura |
| 2020/0331298 A1 | 10/2020 | Isaka |

FOREIGN PATENT DOCUMENTS

| EP | 808730 | * 11/1997 |
| JP | 1-240306 A | 9/1989 |
| JP | 03025005 | * 2/1991 |
| JP | 2567836 B2 | 12/1996 |

OTHER PUBLICATIONS

Machine translation of JP 03025005, 1991.*
Extended European Search Report for European Application No. 22153385.4, dated Jun. 27, 2022.

* cited by examiner

*Primary Examiner* — Justin R Fischer
(74) *Attorney, Agent, or Firm* — Birch, Stewart, Kolasch & Birch, LLP

(57) ABSTRACT

A tire pair includes a front tire 2 and a rear tire 52. The front tire 2 includes a pair of beads 18, a carcass 10 extending on and between a first bead 18 and a second bead 18, a tread 4 located outward of the carcass 10 in a radial direction, and a band 14 located between the tread 4 and the carcass 10 in the radial direction. The carcass 10 includes a large number of carcass cords 30 aligned with each other and each tilted relative to an equator plane. The band 14 includes a band cord 34 extending substantially in a circumferential direction. A ratio (Jf/Jr) of a bending stiffness Jf of the band cord 34 of the front tire 2 to a bending stiffness Jr of a band cord 84 of the rear tire 52 is not less than 0.0 and less than 0.7.

8 Claims, 6 Drawing Sheets

MOTORCYCLE TIRE PAIR

TECHNICAL FIELD

The present invention relates to motorcycle tire pairs.

This application claims priority on Japanese Patent Application No. 2021-24276 filed on Feb. 18, 2021, the entire content of which is incorporated herein by reference.

BACKGROUND ART

A band (jointless band (JLB)) including a spirally wound band cord is known as a component of a motorcycle tire. For example, in PATENT LITERATURE 1 below, the steering performance and stability of a motorcycle are improved by adjusting the strength and the spacing ratio of a band cord for each of a front tire and a rear tire.

CITATION LIST

Patent Literature

PATENT LITERATURE 1: Japanese Patent No. 2567836

SUMMARY OF THE INVENTION

Technical Problem

Meanwhile, in touring, the rider rides a motorcycle for a long time. In such a case, the rider places importance on ride comfort. In the tire pair disclosed in PATENT LITERATURE 1 described above, importance is placed on steering performance and stability, and the ride comfort required by the rider cannot be achieved.

The present invention has been made in view of such circumstances, and an object of the present invention is to provide a motorcycle tire pair that can contribute to improvement of ride comfort.

Solution to Problem

The present inventor has conducted thorough studies with the aim of improving the ride comfort of a motorcycle, and as a result, the present inventor has found that a study focusing on the bending stiffness of a band cord is effective for improving the ride comfort, and the bending stiffness of the band cord also contributes to ensuring stability, and thus has completed the present invention. That is, a motorcycle tire pair according to an aspect of the present invention includes a front tire and a rear tire. Each of the front tire and the rear tire includes a pair of beads, a carcass extending on and between a first bead and a second bead, a tread located outward of the carcass in a radial direction, and a band located between the tread and the carcass in the radial direction. The carcass includes a large number of carcass cords aligned with each other and each tilted relative to an equator plane. The band includes a band cord extending substantially in a circumferential direction. A ratio of a bending stiffness of the band cord of the front tire to a bending stiffness of the band cord of the rear tire is not less than 0.0 and less than 0.7.

Preferably, in the motorcycle tire pair, the bending stiffness of the band cord of the front tire is less than 15.0 g·cm, and the bending stiffness of the band cord of the rear tire is not less than 15.0 g·cm and not greater than 40.0 g·cm.

Preferably, in the motorcycle tire pair, the band cord of the front tire is a cord formed from an aramid fiber, and the band cord of the rear tire is a steel cord.

Preferably, in the motorcycle tire pair, an angle of the carcass cords of the front tire with respect to the equator plane is smaller than an angle of the carcass cords of the rear tire with respect to the equator plane.

Preferably, in the motorcycle tire pair, the angle of the carcass cords of the front tire with respect to the equator plane is not less than 20° and less than 70°, and the angle of the carcass cords of the rear tire with respect to the equator plane is not less than 70°.

Preferably, in the motorcycle tire pair, a density of the band cord in the band of the front tire is higher than a density of the band cord in the band of the rear tire.

Advantageous Effects of the Invention

According to the present invention, a motorcycle tire pair that can contribute to improving ride comfort and ensuring stability is obtained.

DETAILED DESCRIPTION

The following will describe in detail the present invention based on preferred embodiments with appropriate reference to the drawings.

In the present disclosure, a state where a tire is fitted on a normal rim, the internal pressure of the tire is adjusted to a normal internal pressure, and no load is applied to the tire is referred to as a normal state.

In the present disclosure, unless otherwise specified, the dimensions and angles of each component of the tire are measured in the normal state. The dimensions and angles of each component in a meridional cross-section of the tire, which cannot be measured in a state where the tire is fitted on the normal rim, are measured in a cross-section of the tire obtained by cutting the tire along a plane including a rotation axis, with the distance between right and left beads being made equal to the distance between the beads in the tire that is fitted on the normal rim.

The normal rim means a rim specified in a standard on which the tire is based. The "standard rim" in the JATMA standard, the "Design Rim" in the TRA standard, and the "Measuring Rim" in the ETRTO standard are normal rims. A rim in the present disclosure means a normal rim unless otherwise specified.

The normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

A normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

A motorcycle tire pair according to an embodiment of the present invention includes a front tire which is mounted on the front wheel of a motorcycle, and a rear tire which is mounted on the rear wheel of the motorcycle. The following will describe the front tire and the rear tire.

[Front Tire]

Figure 1:
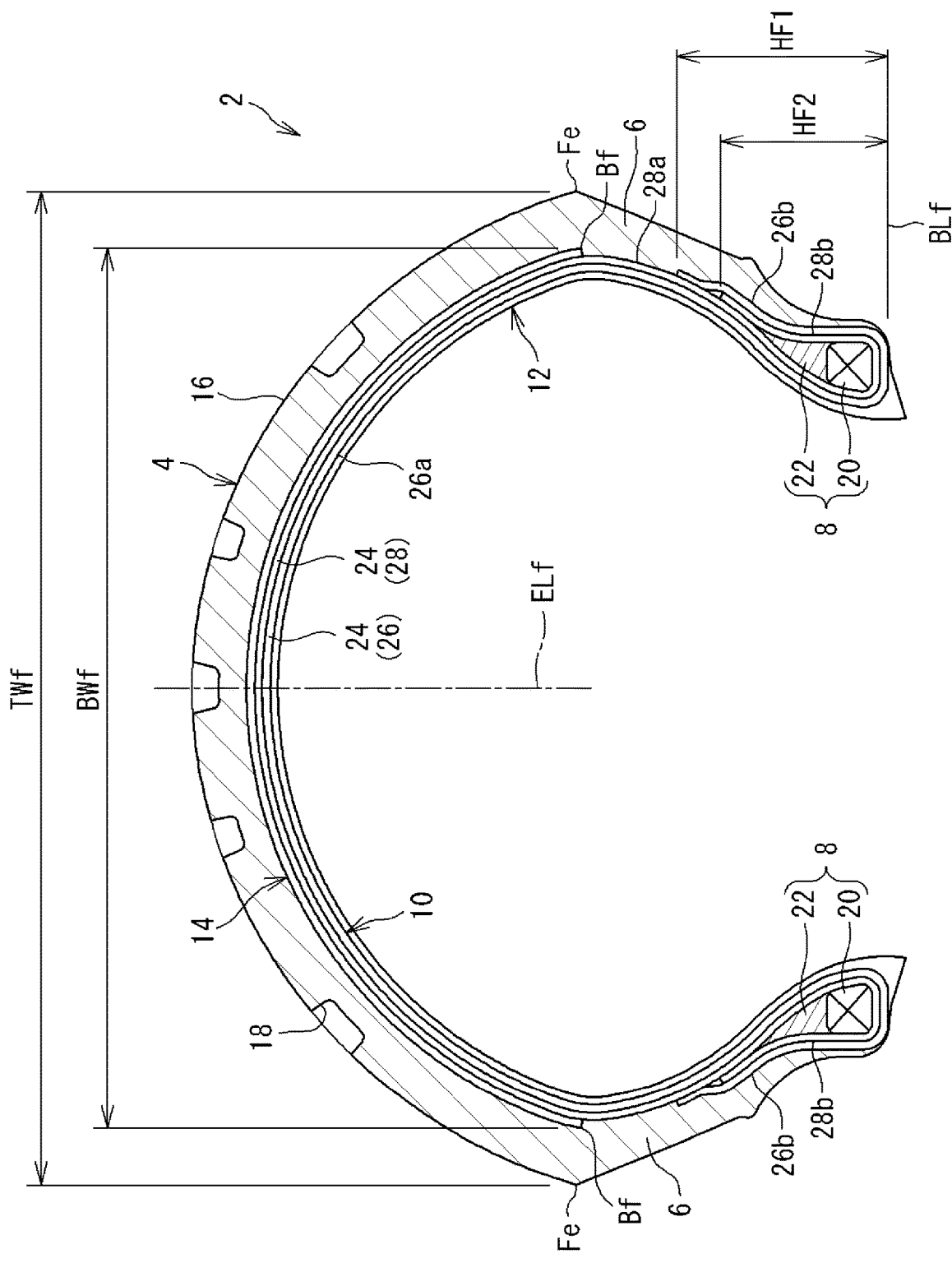
FIG. 1 is a cross-sectional view showing a part of a front tire included in a tire pair according to an embodiment of the present invention.

FIG. 1 shows a part of a cross-section (hereinafter, also referred to as meridional cross-section) of a front tire 2 (hereinafter, tire 2) along a plane including the rotation axis of the tire 2. In FIG. 1, the right-left direction is the axial direction of the tire 2, and the up-down direction is the radial direction of the tire 2. The direction perpendicular to the surface of the sheet of FIG. 1 is the circumferential direction of the tire 2. In FIG. 1, an alternate long and short dash line ELf represents the equator plane of the tire 2.

In FIG. 1, a solid line BLf extending in the axial direction is a bead base line. The bead base line BLf is a line that defines the rim diameter (see JATMA or the like) of a rim (not shown) on which the tire 2 is mounted.

The tire 2 includes a tread 4, a pair of sidewalls 6, a pair of beads 8, a carcass 10, an inner liner 12, and a band 14.

The tread 4 is formed from a crosslinked rubber. The tread 4 comes into contact with a road surface at an outer surface thereof. The outer surface of the tread 4 is a tread surface 16. In the meridional cross-section shown in FIG. 1, the tread surface 16 is curved such that a portion thereof at the equator plane ELf projects radially outward. A groove 18 is formed on the tread 4. Accordingly, a tread pattern is formed. The groove 18 does not have to be formed on the tread 4.

In FIG. 1, a position indicated by reference character Fe is an end of the tread surface 16. A length indicated by a double-headed arrow TWf is a tread width. The tread width TWf is represented as the distance in the axial direction from a first end Fe of the tread surface 16 to a second end Fe of the tread surface 16. In the tire 2, each end Fe of the tread surface 16 is an outer end in the axial direction of the tire 2. The tread width TWf is also the maximum width of the tire 2.

Each sidewall 6 is formed from a crosslinked rubber. The sidewall 6 is connected to an end of the tread 4. The sidewall 6 is located inward of the tread 4 in the radial direction. The sidewall 6 extends in the radial direction along the carcass 10.

Each bead 8 is located inward of the sidewall 6 in the radial direction. The bead 8 includes a core 20 and an apex 22. The core 20 includes a steel wire which is not shown. The apex 22 is located outward of the core 20 in the radial direction. The apex 22 is tapered outward. The apex 22 is formed from a crosslinked rubber that has high stiffness.

The carcass 10 is located inward of the tread 4 and the pair of sidewalls 6. The carcass 10 extends on and between a first bead 8 and a second bead 8. The above-described tread 4 is located outward of the carcass 10 in the radial direction.

The carcass 10 includes at least one carcass ply 24. The carcass 10 of the tire 2 includes two carcass plies 24. The carcass ply 24 located on the inner side in the radial direction on the inner side of the tread 4 is a first carcass ply 26, and the carcass ply 24 located outward of the first carcass ply 26 is a second carcass ply 28.

The first carcass ply 26 includes a first ply body 26a which extends on and between a first core 20 and a second core 20, and a pair of first turned-up portions 26b which are connected to the first ply body 26a and turned up around the respective cores 20 from the inner side toward the outer side in the axial direction.

The second carcass ply 28 includes a second ply body 28a which extends on and between the first core 20 and the second core 20, and a pair of second turned-up portions 28b which are connected to the second ply body 28a and turned up around the respective cores 20 from the inner side toward the outer side in the axial direction.

In FIG. 1, a double-headed arrow HF1 indicates the distance in the radial direction from the bead base line BLf to an end of the first turned-up portion 26b. The distance HF1 is the height of the first turned-up portion 26b. A double-headed arrow HF2 indicates the distance in the radial direction from the bead base line BLf to an end of the second turned-up portion 28b. The distance HF2 is the height of the second turned-up portion 28b. In the tire 2, the height HF1 of the first turned-up portion 26b is larger than the height HF2 of the second turned-up portion 28b. The height HF1 of the first turned-up portion 26b may be smaller than the height HF2 of the second turned-up portion 28b.

Figure 2:
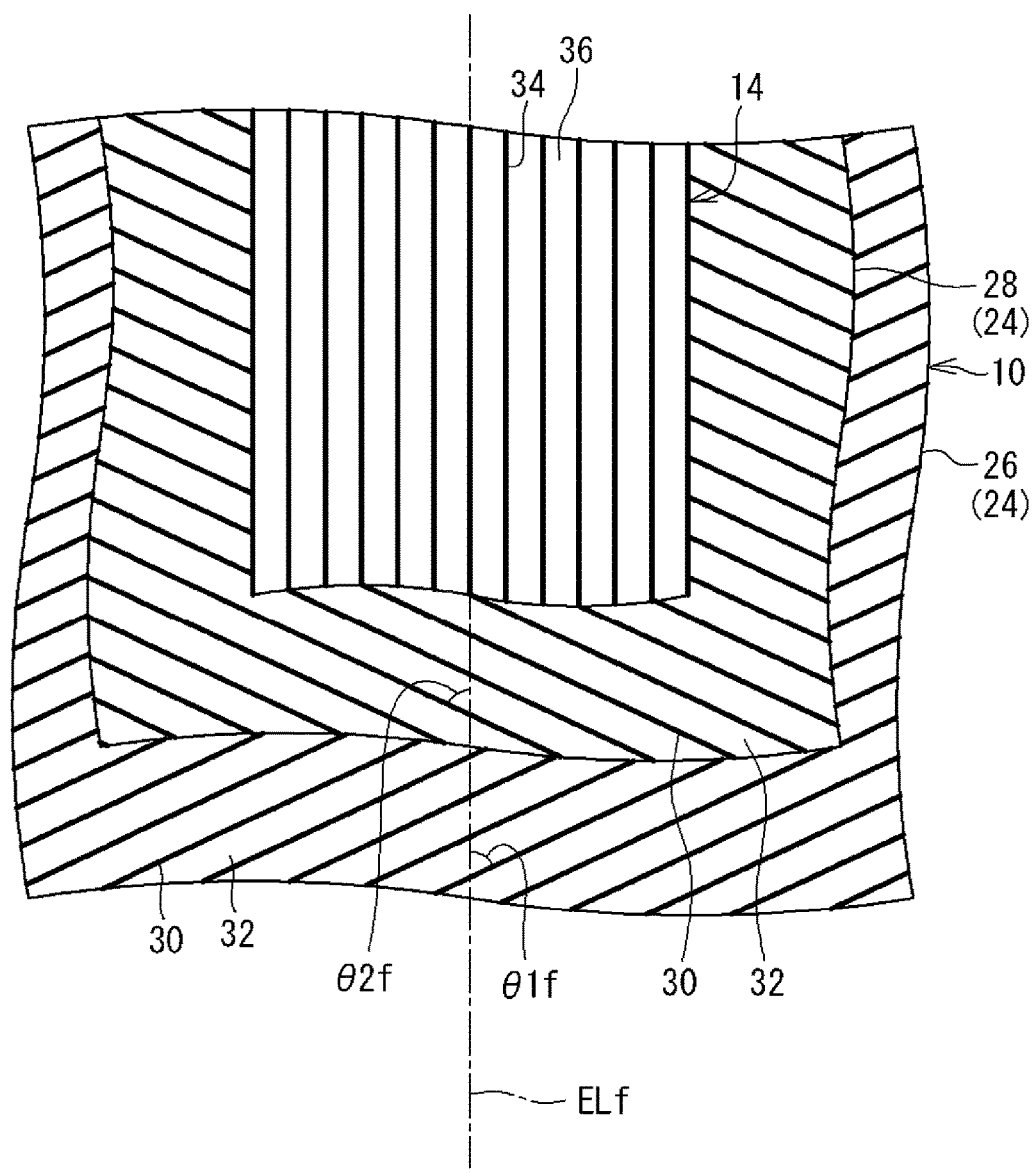
FIG. 2 is a schematic diagram illustrating the configuration of a carcass and a band in the front tire.

FIG. 2 shows the configuration of the carcass 10 together with the band 14 described later. In FIG. 2, the right-left direction is the axial direction of the tire 2, and the up-down direction is the circumferential direction of the tire 2. The direction perpendicular to the surface of the sheet of FIG. 2 is the radial direction of the tire 2. The front side of the sheet of FIG. 2 is the outer side in the radial direction, and the back side thereof is the inner side in the radial direction.

As shown in FIG. 2, each carcass ply 24 included in the carcass 10 includes a large number of carcass cords 30 aligned with each other. In FIG. 2, for convenience of description, each carcass cord 30 is represented by a solid line, but the carcass cords 30 are covered with a topping rubber 32.

Each carcass cord 30 is tilted relative to the equator plane ELf. As shown in FIG. 2, the direction in which each carcass cord 30 in the first carcass ply 26 is tilted is opposite to the direction in which each carcass cord 30 in the second carcass ply 28 is tilted. In FIG. 2, an angle indicated by reference character $\theta 1f$ is the angle of each carcass cord 30 in the first carcass ply 26 with respect to the equator plane ELf. An angle indicated by reference character $\theta 2f$ is the angle of each carcass cord 30 in the second carcass ply 28 with respect to the equator plane ELf. In the tire 2, the tilt angle $\theta 1f$ is equal to the tilt angle $\theta 2f$.

In the present disclosure, the average value of the angle $\theta 1f$ and the angle $\theta 2f$ is used as an angle $\theta f$ of the carcass cords 30 with respect to the equator plane ELf (hereinafter, also referred to as tilt angle $\theta f$ of the carcass cords 30). A tilt angle $\theta r$ of carcass cords of the rear tire, which will be described later, is also represented in the same manner as the tire 2.

Each carcass cord 30 is a cord formed from an organic fiber. Examples of the organic fiber include nylon fibers, rayon fibers, polyester fibers, and aramid fibers.

The inner liner 12 is located inward of the carcass 10. The inner liner 12 forms an inner surface of the tire 2. The inner liner 12 is formed from a crosslinked rubber that has a low gas permeability coefficient. The inner liner 12 maintains the internal pressure of the tire 2.

The band 14 is located between the tread 4 and the carcass 10 in the radial direction. As shown in FIG. 1, the band 14 is laminated on the carcass 10. A position indicated by reference character Bf is an end of the band 14. A length indicated by a double-headed arrow BWf is the width of the band 14. The width BWf of the band 14 is represented as the distance in the axial direction from a first end Bf of the band 14 to a second end Bf of the band 14. In the tire 2, the ratio (BWf/TWf) of the width BWf of the band 14 to the tread width TWf is not less than 0.80 and not greater than 0.95.

The band 14 includes a spirally wound band cord 34. In FIG. 2, for convenience of description, the band cord 34 is represented by a solid line, but the band cord 34 is covered with a topping rubber 36. In the tire 2, the band cord 34 extends substantially in the circumferential direction. Specifically, the angle of the band cord 34 with respect to the circumferential direction is not greater than 5°. The band 14 is also referred to as jointless band.

The band cord 34 is a steel cord or a cord formed from an organic fiber. Examples of the organic fiber include nylon fibers, rayon fibers, polyester fibers, and aramid fibers.

Figure 3:
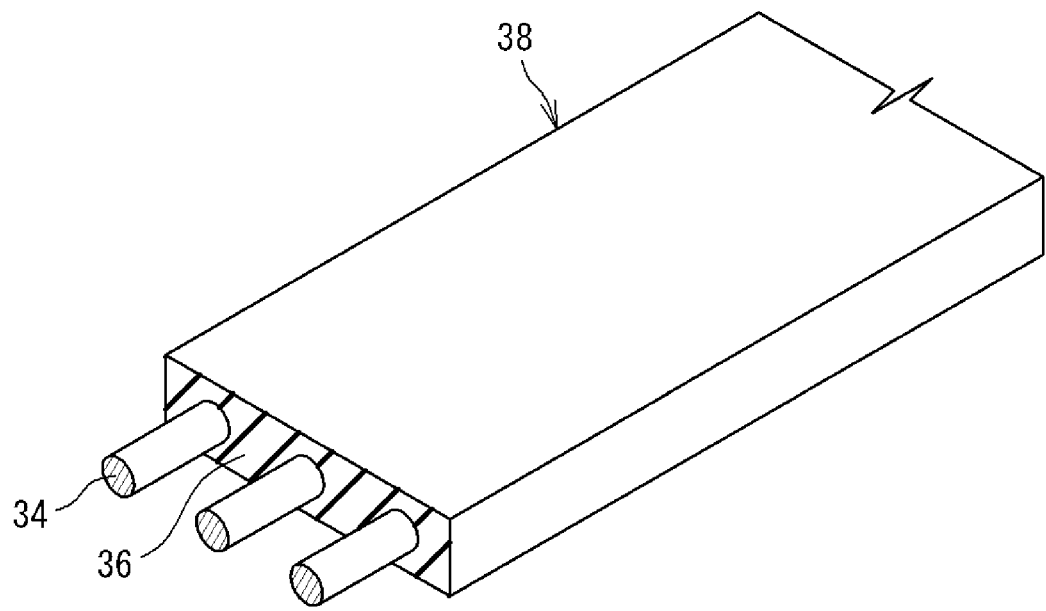
FIG. 3 is a perspective view showing a part of a strip used for forming the band of the front tire.

A strip 38 in FIG. 3 is used for forming the band 14. The strip 38 has a tape shape. The strip 38 includes the band cord 34 and the topping rubber 36. In the strip 38, the topping rubber 36 is in an unvulcanized state. The strip 38 includes a plurality of band cords 34 aligned with each other in the width direction thereof. The number of band cords 34 included in the strip 38 may be one. Although not described in detail, the band 14 is formed by spirally winding the strip 38 in the circumferential direction.

Although not shown, a large number of cross sections of the band cord 34 are aligned in a line in the cross-section of the band 14 included in the meridional cross-section of the tire 2. In other words, the band 14 of the tire 2 includes one band ply.

In the tire 2, the number of cross-sections of the band cord 34 included per 5 cm width of a cross-section of the band 14 obtained in a zone having a width of 10 cm and centered on the equator plane ELf, in the meridional cross-section of the tire 2, is represented as a density Df of the band cord 34 in the band 14. The unit of the density Df of the band cord 34 is ends/5 cm. A density Dr of a band cord of the rear tire is also represented in the same manner as the tire 2.

In the tire 2, from the viewpoint of ensuring puncture resistance, the density Df of the band cord 34 in the band 14 is preferably not less than 30 ends/5 cm. From the viewpoint of weight reduction, the density Df of the band cord 34 is preferably not greater than 50 ends/5 cm.

[Rear Tire]

Figure 4:
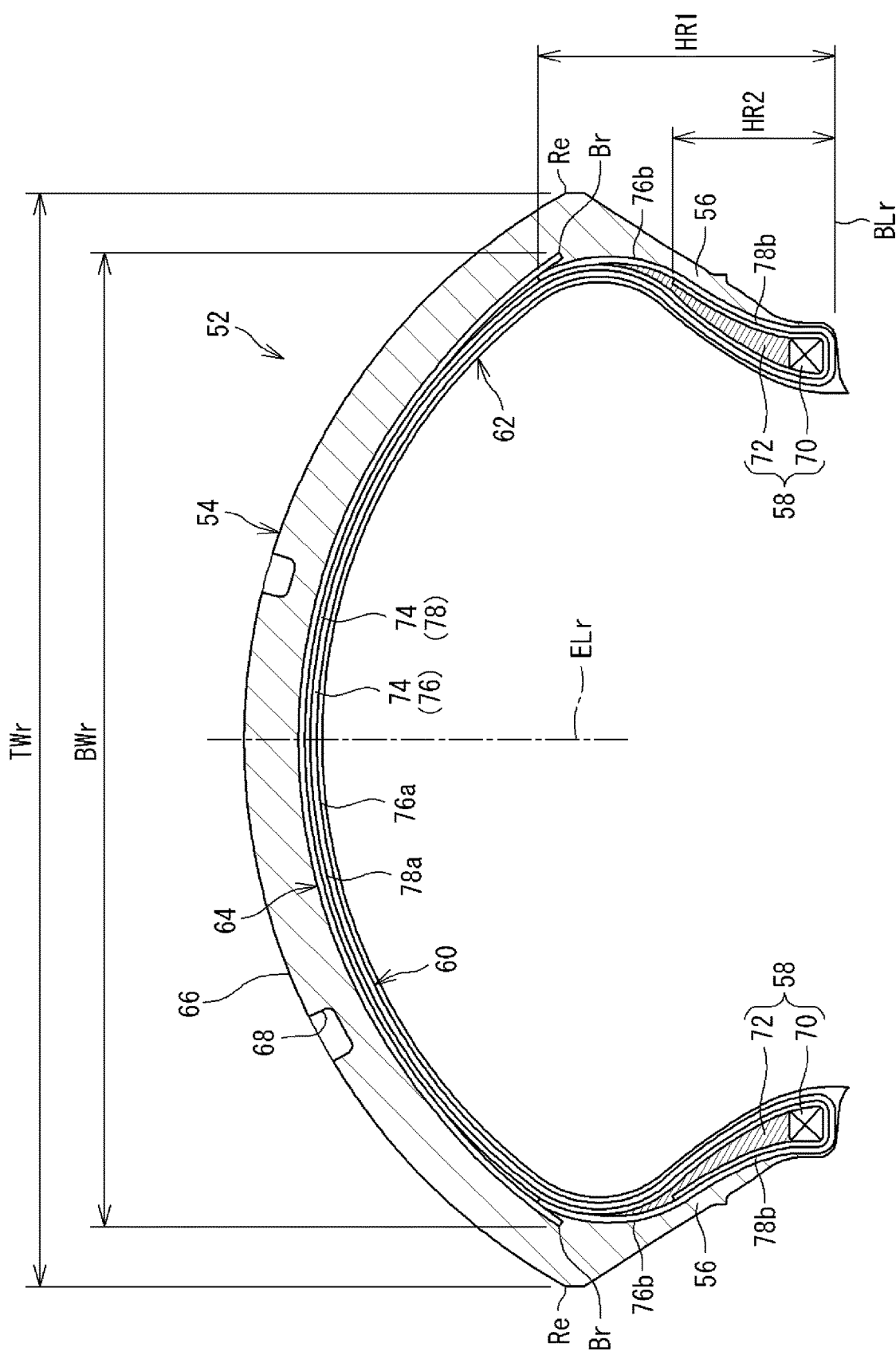
FIG. 4 is a cross-sectional view showing a part of a rear tire included in the tire pair according to the embodiment of the present invention.

FIG. 4 shows a part of a meridional cross-section of a rear tire 52 (hereinafter, tire 52). In FIG. 4, the right-left direction is the axial direction of the tire 52, and the up-down direction is the radial direction of the tire 52. The direction perpendicular to the surface of the sheet of FIG. 4 is the circumferential direction of the tire 52. In FIG. 4, an alternate long and short dash line ELr represents the equator plane of the tire 52.

In FIG. 4, a solid line BLr extending in the axial direction is a bead base line. The bead base line BLr is a line that defines the rim diameter (see JATMA or the like) of a rim (not shown) on which the tire 52 is mounted.

The tire 52 includes a tread 54, a pair of sidewalls 56, a pair of beads 58, a carcass 60, an inner liner 62, and a band 64.

The tread 54 is formed from a crosslinked rubber. The tread 54 comes into contact with a road surface at a tread surface 66 thereof. In the meridional cross-section, the tread surface 66 is curved such that a portion thereof at the equator plane ELr projects radially outward. A groove 68 is formed on the tread 54. Accordingly, a tread pattern is formed. The groove 68 does not have to be formed on the tread 54.

In FIG. 4, a position indicated by reference character Re is an end of the tread surface 66. A length indicated by a double-headed arrow TWr is a tread width. In the tire 52 as well, each end Re of the tread surface 66 is an outer end in the axial direction of the tire 52.

Each sidewall 56 is formed from a crosslinked rubber. The sidewall 56 is connected to an end of the tread 54. The sidewall 56 is located inward of the tread 54 in the radial direction. The sidewall 56 extends in the radial direction along the carcass 60.

Each bead 58 is located inward of the sidewall 56 in the radial direction. The bead 58 includes a core 70 and an apex 72. The core 70 includes a steel wire which is not shown. The apex 72 is located outward of the core 70 in the radial direction. The apex 72 is tapered outward. The apex 72 is formed from a crosslinked rubber that has high stiffness.

The carcass 60 is located inward of the tread 54 and the pair of sidewalls 56.

The carcass 60 extends on and between a first bead 58 and a second bead 58. The above-described tread 54 is located outward of the carcass 60 in the radial direction.

The carcass 60 includes at least one carcass ply 74. The carcass 60 of the tire 52 includes two carcass plies 74, that is, a first carcass ply 76 and a second carcass ply 78.

The first carcass ply 76 includes a first ply body 76a which extends on and between a first core 70 and a second core 70, and a pair of first turned-up portions 76b which are connected to the first ply body 76a and turned up around the respective cores 70 from the inner side toward the outer side in the axial direction.

The second carcass ply 78 includes a second ply body 78a which extends on and between the first core 70 and the second core 70, and a pair of second turned-up portions 78b which are connected to the second ply body 78a and turned up around the respective cores 70 from the inner side toward the outer side in the axial direction.

In FIG. 4, a double-headed arrow HR1 indicates the height of the first turned-up portion 76b. A double-headed arrow HR2 indicates the height of the second turned-up portion 78b. In the tire 52, the height HR1 of the first turned-up portion 76b is larger than the height HR2 of the second turned-up portion 78b. The height HR1 of the first turned-up portion 76b may be smaller than the height HR2 of the second turned-up portion 78b.

Figure 5:
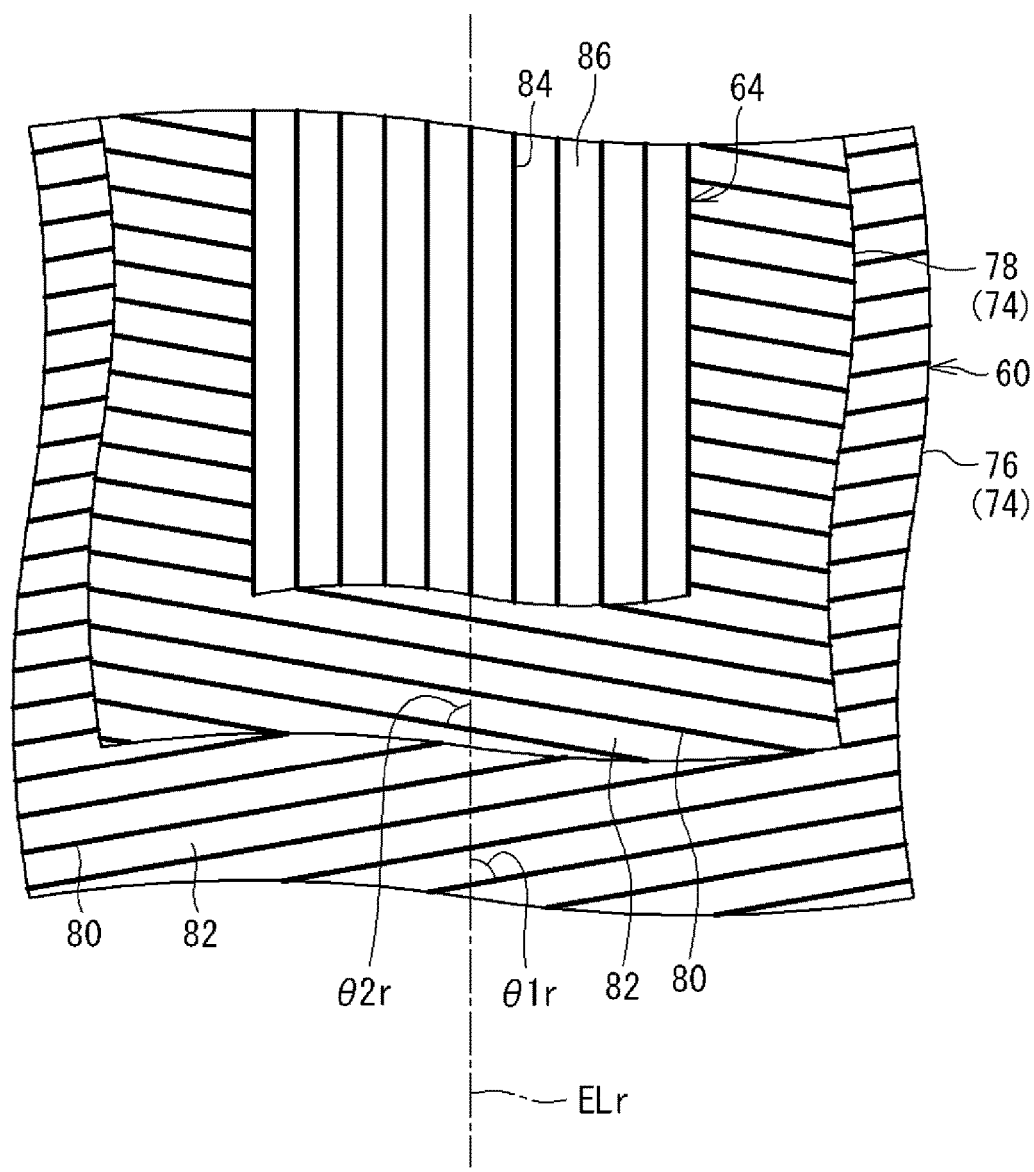
FIG. 5 is a schematic diagram illustrating the configuration of a carcass and a band in the rear tire.

FIG. 5 shows the configuration of the carcass 60 together with the band 64 described later. In FIG. 5, the right-left direction is the axial direction of the tire 52, and the up-down direction is the circumferential direction of the tire 52. The direction perpendicular to the surface of the sheet of FIG. 5 is the radial direction of the tire 52. The front side of the sheet of FIG. 5 is the outer side in the radial direction, and the back side thereof is the inner side in the radial direction.

As shown in FIG. 5, each carcass ply 74 includes a large number of carcass cords 80 aligned with each other. In FIG. 5 as well, for convenience of description, each carcass cord 80 is represented by a solid line, but the carcass cords 80 are covered with a topping rubber 82.

Each carcass cord 80 is tilted relative to the equator plane ELr. As shown in FIG. 5, the direction in which each carcass cord 80 in the first carcass ply 76 is tilted is opposite to the direction in which each carcass cord 80 in the second carcass ply 78 is tilted. In FIG. 5, an angle indicated by reference character $\theta 1r$ is the angle of each carcass cord 80 in the first carcass ply 76 with respect to the equator plane ELr. An angle indicated by reference character θ2r is the angle of each carcass cord 80 in the second carcass ply 78 with respect to the equator plane ELr. In the tire 52, the tilt angle θ1r is equal to the tilt angle θ2r.

In the tire 52, each carcass cord 80 is a cord formed from an organic fiber. Examples of the organic fiber include nylon fibers, rayon fibers, polyester fibers, and aramid fibers.

The inner liner 62 is located inward of the carcass 60. The inner liner 62 forms an inner surface of the tire 52. The inner liner 62 is formed from a crosslinked rubber that has a low gas permeability coefficient. The inner liner 62 maintains the internal pressure of the tire 52.

The band 64 is located between the tread 54 and the carcass 60 in the radial direction. As shown in FIG. 4, the band 64 is laminated on the carcass 60. Similar to the band 14 of the front tire 2, the band 64 includes one band ply.

In FIG. 4, a position indicated by reference character Br is an end of the band 64. A length indicated by a double-headed arrow BWr is the width of the band 64. In the tire 52, the ratio (BWr/TWr) of the width BWr of the band 64 to the tread width TWr is not less than 0.80 and not greater than 0.95.

The band 64 includes a spirally wound band cord 84. In FIG. 5 as well, for convenience of description, the band cord 84 is represented by a solid line, but the band cord 84 is covered with a topping rubber 86. In the tire 52, the band cord 84 extends substantially in the circumferential direction. Specifically, the angle of the band cord 84 with respect to the circumferential direction is not greater than 5°.

The band cord 84 is a steel cord or a cord formed from an organic fiber. Examples of the organic fiber include nylon fibers, rayon fibers, polyester fibers, and aramid fibers.

Although not shown, a strip is used for forming the band 64, similar to the band 14 of the front tire 2. Although not described in detail, the band 64 is formed by spirally winding the strip in the circumferential direction.

In the tire 52, from the viewpoint of ensuring puncture resistance, the density Dr of the band cord 84 in the band 64 is preferably not less than 30 ends/5 cm. From the viewpoint of weight reduction, the density Dr of the band cord 84 is preferably not greater than 50 ends/5 cm.

[Tire Pair]

The present inventor has conducted thorough studies for improving the ride comfort of a motorcycle, and as a result, the present inventor has found that a study focusing on the bending stiffness of a band cord is effective for improving the ride comfort, and the bending stiffness of the band cord also contributes to ensuring stability, and thus has completed the present invention.

In the present disclosure, the bending stiffness of the band cord is the average value of a bending moment at +15 degrees and a bending moment at −15 degrees. The unit of the bending stiffness is g·cm, and the bending stiffness is represented by a value rounded off to the second decimal place. If the bending stiffness of the band cord is too small to measure, the bending stiffness of the band cord is represented as 0.0 g·cm. The bending moment at +15 degrees and the bending moment at −15 degrees are obtained, for example, by using a stiffness tester (for example, 150-D type) manufactured by TABER INDUSTRIES (USA) as follows.

A band cord (length=145 mm) is sampled from the band of the tire.

Figure 6:
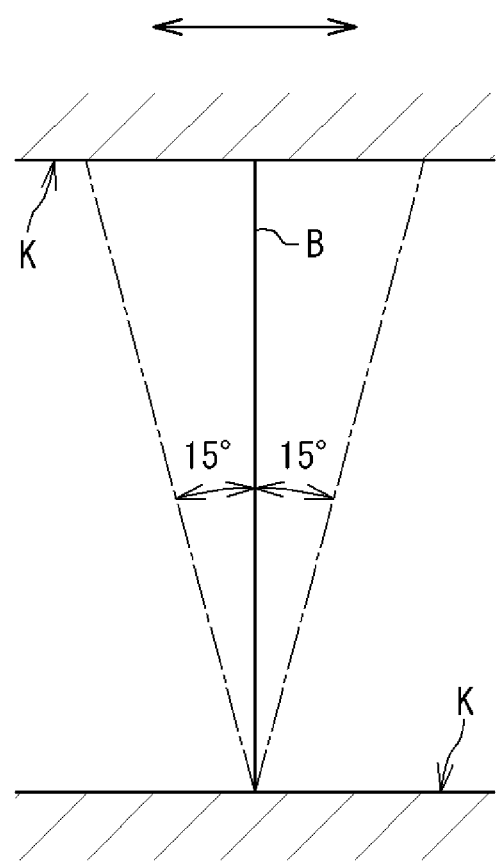
FIG. 6 is a schematic diagram illustrating a method for measuring the bending stiffness of a band cord.

As shown in FIG. 6, both ends of the band cord (reference character B in FIG. 6) are attached to clamps (reference character K in FIG. 6).

By moving a second clamp K relative to a first clamp K, bending angles of +15 degrees and −15 degrees are given to the band cord B.

The bending moment when a bending angle of +15 degrees is given is obtained as the bending moment at +15 degrees, and the bending moment when a bending angle of −15 degrees is given is obtained as the bending moment at −15 degrees.

In a single tire, a band cord having a low bending stiffness contributes to improvement of ride comfort. If the bending stiffness of the band cord is excessively low, when a high load is applied to the tire, the tire becomes significantly deformed. The tire having a large amount of deformation decreases stability.

In a motorcycle, due to its structure, the rear wheel side of a vehicle body is heavier than the front wheel side of the vehicle body. During high speed running, lift acts, so that the rear wheel side becomes even heavier. Therefore, the band cord of the rear tire mounted on the rear wheel needs to have a bending stiffness having a certain value or higher.

As described above, even if the bending stiffness of the band cord is adjusted in a single tire, it is difficult to well-balance ride comfort and stability.

Therefore, the present inventor has conducted thorough studies focusing on the fact that the contribution of the front tire is high for ride comfort and the contribution of the rear tire is high for stability, and as a result, the present inventor has found that ride comfort and stability are well-balanced in a tire pair that uses a band cord having a low bending stiffness for the front tire and that uses a band cord having a high bending stiffness for the rear tire, and has also found that when the ratio of the bending stiffness of the band cord of the front tire to the bending stiffness of the band cord of the rear tire is set to be not less than 0.7, the ride comfort is decreased due to the front tire and the stability is decreased due to the rear tire.

That is, in this tire pair, the ratio (Jf/Jr) of a bending stiffness Jf of the band cord 34 of the front tire 2 to a bending stiffness Jr of the band cord 84 of the rear tire 52 is not less than 0.0 and less than 0.7. In the tire pair, the front tire 2 contributes to improving ride comfort, and the rear tire 52 contributes to ensuring stability. With the tire pair including the front tire 2 and the rear tire 52, good ride comfort and stability are achieved. With the tire pair, it is possible to improve ride comfort and ensure stability, which cannot be achieved by tuning the band cord in a single tire.

In the tire pair, preferably, the bending stiffness Jf of the band cord 34 of the front tire 2 is less than 15.0 g·cm, and the bending stiffness Jr of the band cord 84 of the rear tire 52 is not less than 15.0 g·cm and not greater than 40.0 g·cm.

When the bending stiffness Jf of the band cord 34 of the front tire 2 is set to be less than 15.0 g·cm, a decrease in ride comfort due to the front tire 2 is suppressed. From this viewpoint, the bending stiffness Jf is more preferably not greater than 10.0 g·cm. From the viewpoint of ride comfort, it is more preferable that the bending stiffness Jf is lower, so that a preferable lower limit of the bending stiffness Jf is not set.

When the bending stiffness Jr of the band cord 84 of the rear tire 52 is set to be not less than 15.0 g·cm, a decrease in stability due to the rear tire 52 is suppressed. When the bending stiffness Jr is set to be not greater than 40.0 g·cm, a decrease in ride comfort due to the rear tire 52 is suppressed. From this viewpoint, the bending stiffness Jr is more preferably not greater than 30 g·cm.

From the viewpoint of obtaining good ride comfort and stability, more preferably, the bending stiffness Jf of the band cord 34 of the front tire 2 is not greater than 10.0 g·cm, and the bending stiffness Jr of the band cord 84 of the rear tire 52 is not less than 15.0 g·cm and not greater than 30.0 g·cm.

As described above, the band cord 34 of the front tire 2 is a steel cord or a cord formed from an organic fiber. Since the band cord 34 is formed so as to have the low bending stiffness Jf, when a steel cord is used as the band cord 34, a steel cord having a small diameter is used. In this case, the strength of the band cord 34 is reduced, so that there is a possibility that the water pressure resistance fracture strength cannot meet a predetermined standard. When a cord formed from an organic fiber other than an aramid fiber, as a cord formed from an organic fiber, is used as the band cord 34, the holding force by the band 14 may be insufficient, and the high-speed stability may be decreased. From the viewpoint of preventing a decrease in water pressure resistance fracture strength and high-speed stability due to the band 14, the band cord 34 of the front tire 2 in the tire pair is preferably a cord formed from an aramid fiber. By confirming the water pressure resistance fracture strength of the tire, the durability of the tire when the inside of the tire is excessively filled with air can be grasped.

As described above, the band cord 84 of the rear tire 52 is a steel cord or a cord formed from an organic fiber. Since the band cord 84 has the high bending stiffness Jr, when a cord formed from an organic fiber is used as the band cord 84, a cord formed from an organic fiber and having a large diameter is used. In this case, the proportion of the band cord 84 in the band 64 is increased, and the amount of the topping rubber 86 covering the band cord 84 is decreased. When the band cord 84 cannot be covered with a sufficient amount of the topping rubber 86, the topping rubber 86 is likely to be peeled from the band cord 84, and the durability of the rear tire 52 may be decreased. From the viewpoint of preventing a decrease in durability due to the band 64, the band cord 84 of the rear tire 52 in the tire pair is preferably a steel cord.

In the tire pair, the band cord 34 having the low bending stiffness Jf is used for the band 14 of the front tire 2, so that the stress when a slip angle is given to the front tire 2 is decreased. Depending on the degree of stress decrease, the cornering performance may be impaired.

However, in the tire pair, the tilt angle θf of the carcass cords 30 of the front tire 2 is smaller than the tilt angle θr of the carcass cords 80 of the rear tire 52. The small tilt angle θf increases the stress when a slip angle is given to the front tire 2, so that the cornering force of the front tire 2 is made larger than the cornering force of the rear tire 52. The cornering performance of the motorcycle is improved even though the band cord 34 having the low bending stiffness Jf is used for the band 14 of the front tire 2 in the tire pair. From this viewpoint, the tilt angle θf of the carcass cords 30 of the front tire 2 is preferably smaller than the tilt angle θr of the carcass cords 80 of the rear tire 52. Specifically, the difference (θr−θf) between the tilt angle vr of the carcass cords 80 of the rear tire 52 and the tilt angle θf of the carcass cords 30 of the front tire 2 is preferably not less than 5° and more preferably not less than 8°. The difference (θr−θf) is preferably not greater than 25° and more preferably not greater than 20°.

In the tire pair, preferably, the tilt angle θf of the carcass cords 30 of the front tire 2 is not less than 20° and less than 70°, and the tilt angle θr of the carcass cords 80 of the rear tire 52 is not less than 70°.

When the tilt angle θf is set to be not less than 20°, the stiffness of the carcass 10 in the front tire 2 is appropriately maintained, so that good ride comfort is maintained. From this viewpoint, the tilt angle θf is more preferably not less than 30° and further preferably not less than 40°. When the tilt angle θf is set to be less than 70°, the carcass 10 contributes to improvement of the cornering performance. From this viewpoint, the tilt angle θf is more preferably not greater than 68° and further preferably not greater than 65°.

When the tilt angle θr is set to be not less than 70°, the stiffness of the carcass 60 in the rear tire 52 is appropriately maintained. The contribution of the rear tire 52 to the cornering performance and the contribution of the front tire 2 to the cornering performance are well-balanced, so that good lightness is maintained in the motorcycle. The tire pair can effectively contribute to improvement of the cornering performance. From this viewpoint, the tilt angle θr is more preferably not less than 72° and further preferably not less than 80°. The upper limit of the tilt angle θr is 90°.

The density of the band cord in the band affects the stress when a slip angle is given to the tire. The higher the density of the band cord, the greater the stress that occurs when a slip angle is given to the tire. Great stress contributes to improvement of the cornering force of the tire.

In the tire pair, the density Df of the band cord 34 in the band 14 of the front tire 2 is higher than the density Dr of the band cord 84 in the band 64 of the rear tire 52. Therefore, the cornering force of the front tire 2 is made larger than the cornering force of the rear tire 52. The cornering performance of the motorcycle is improved even though the band cord 34 having the low bending stiffness Jf is used for the band 14 of the front tire 2 in the tire pair. From this viewpoint, the density Df of the band cord 34 in the band 14 of the front tire 2 is preferably higher than the density Dr of the band cord 84 in the band 64 of the rear tire 52. Specifically, the ratio (Df/Dr) of the density Df of the band cord 34 in the band 14 of the front tire 2 to the density Dr of the band cord 84 in the band 64 of the rear tire 52 is preferably not less than 1.1 and more preferably not less than 1.2. From the viewpoint of well-balancing the stiffness of the front tire 2 and the stiffness of the rear tire 52, the ratio (Df/Dr) is preferably not greater than 1.4 and more preferably not greater than 1.3.

As described above, according to the present invention, a motorcycle tire pair that can contribute to improving ride comfort and ensuring stability is obtained.

EXAMPLES

The following will describe the present invention in further detail by means of examples, etc., but the present invention is not limited to the examples.

Example 1

A motorcycle tire pair including a front tire (120/70ZR17) having the basic structure shown in FIG. 1 and having specifications shown in Table 1 below and a rear tire (180/55ZR17) having the basic structure shown in FIG. 4 and having specifications shown in Table 1, was obtained.

In the front tire of Example 1, a cord formed from an aramid fiber was used as the band cord. This is represented as "K" in the cell for band cord under F in Table 1. The bending stiffness Jf and the density Df of the band cord and the tilt angle θf of the carcass cords are as shown in Table 1 below.

In the front tire, a cord formed from a rayon fiber was used as each carcass cord. The configuration of the carcass cord was 1840 dtex/2. The height HF1 of each first turned-up portion was 45 mm, and the height HF2 of each second turned-up portion was 20 mm.

In the rear tire of Example 1, a steel cord was used as the band cord. This is represented as "S" in the cell for band cord under R in Table 1. The bending stiffness Jr and the density Dr of the band cord and the tilt angle θr of the carcass cords are as shown in Table 1 below.

In the rear tire, a cord formed from a rayon fiber was used as each carcass cord. The configuration of the carcass cord was 1840 dtex/2. The height HR1 of each first turned-up portion was 50 mm, and the height HR2 of each second turned-up portion was 30 mm.

Example 2

A tire pair of Example 2 was obtained in the same manner as Example 1, except that the tilt angle θr of the carcass cords of the rear tire is as shown in Table 1 below.

Example 3

A tire pair of Example 3 was obtained in the same manner as Example 2, except that the tilt angle θf of the carcass cords of the front tire is as shown in Table 1 below.

Example 4

A tire pair of Example 4 was obtained in the same manner as Example 3, except that the density Df of the band cord of the front tire is as shown in Table 1 below.

Examples 5 to 10 and Comparative Examples 1 to 3

Tire pairs of Examples 5 to 10 and Comparative Examples 1 to 3 were obtained in the same manner as Example 1, except that the specifications of the band cord of the front tire and the specifications of the band cord of the rear tire are as shown in Tables 1 and 2 below.

[Steering Stability]

A front tire was fitted onto a rim (MT 3.50×17) and inflated with air to adjust the internal pressure of the tire to 250 kPa. A rear tire was fitted onto a rim (MT 5.50×17) and inflated with air to adjust the internal pressure of the tire to 290 kPa.

The front tire and the rear tire were mounted to a large motorcycle (engine displacement=1300 cc). The motorcycle was caused to run on a test course having a dry asphalt road surface, and sensory evaluations (5-point method) were made by a test rider for ride comfort, stability, and cornering performance. The results are shown as indexes in Tables 1 and 2 below. The total value of the indexes of the respective items is described in each cell for steering stability in Tables 1 and 2. A higher value indicates a better result.

[Durability]

A test tire (rear tire) was caused to run on a drum tester under the following conditions. The broken state of each cord and the peeled state of each member after running were visually confirmed. The results are shown as indexes in Tables 1 and 2 below. A higher value indicates that the tire has better durability.

Rim: MT 5.50×17
Internal pressure: 235 kPa
Speed: 80 km/h
Vertical load: 4.41 kN
Running distance: 16000 km

[Water Pressure Resistance Fracture Strength]

A test tire (front tire) was fitted onto a rim (MT 3.50×17), and the inside of the tire was filled with water to increase the internal pressure of the tire and destroy the tire. The pressure when the tire was destroyed was measured. The results are shown as indexes in Tables 1 and 2 below. A higher value indicates that the water pressure resistance fracture strength of the tire is higher.

TABLE 1

|   |   |   | Comp. Ex. 1 | Comp. Ex. 2 | Comp. Ex. 3 | Ex. 1 | Ex. 2 | Ex. 3 | Ex. 4 |
|---|---|---|---|---|---|---|---|---|---|
| F | Band | Jf [g·cm] | 30.0 | 30.0 | 30.0 | 0.0 | 0.0 | 0.0 | 0.0 |
|   |   | Band cord | S | S | S | K | K | K | K |
|   |   | Df [ends/5 cm] | 35 | 35 | 35 | 35 | 35 | 35 | 43 |
|   | Carcass | θf [°] | 72 | 72 | 72 | 72 | 72 | 65 | 65 |
| R | Band | Jr [g·cm] | 9.0 | 0.0 | 41.0 | 15.0 | 15.0 | 15.0 | 15.0 |
|   |   | Band cord | S | K | S | S | S | S | S |
|   |   | Dr [ends/5 cm] | 35 | 35 | 35 | 35 | 35 | 35 | 35 |
|   | Carcass | θr [°] | 72 | 72 | 72 | 72 | 80 | 80 | 80 |
|   | Jf/Jr [-] |   | 3.3 | 3000.0 | 0.7 | 0.0 | 0.0 | 0.0 | 0.0 |
|   | Df/Dr [-] |   | 1.0 | 1.0 | 1.0 | 1.0 | 1.0 | 1.0 | 1.2 |
|   | θr − θf [°] |   | 0 | 0 | 0 | 0 | 8 | 15 | 15 |
|   | Ride comfort |   | 3.0 | 3.0 | 2.8 | 4.0 | 4.0 | 4.0 | 4.0 |
|   | Stability |   | 3.0 | 2.3 | 3.6 | 3.6 | 3.6 | 3.6 | 3.6 |
|   | Cornering performance |   | 3.0 | 2.7 | 2.7 | 2.6 | 3.2 | 3.6 | 3.8 |
|   | Steering stability |   | 9.0 | 8.0 | 9.1 | 10.2 | 10.8 | 11.2 | 11.4 |
|   | Durability |   | 95 | 95 | 100 | 100 | 100 | 100 | 100 |
|   | Water pressure resistance fracture strength |   | 100 | 100 | 100 | 105 | 105 | 105 | 105 |

TABLE 2

| | | | Ex. 5 | Ex. 6 | Ex. 7 | Ex. 8 | Ex. 9 | Ex. 10 |
|---|---|---|---|---|---|---|---|---|
| F | Band | Jf [g·cm] | 25.0 | 16.0 | 16.0 | 13.0 | 10.0 | 3.0 |
| | | Band cord | S | S | S | S | S | S |
| | | Df [ends/5 cm] | 35 | 35 | 35 | 35 | 35 | 35 |
| | Carcass | θf [°] | 72 | 72 | 72 | 72 | 72 | 72 |
| R | Band | Jr [g·cm] | 40.0 | 40.0 | 30.0 | 30.0 | 30.0 | 15.0 |
| | | Band cord | S | S | S | S | S | S |
| | | Dr [ends/5 cm] | 35 | 35 | 35 | 35 | 35 | 35 |
| | Carcass | θr [°] | 72 | 72 | 72 | 72 | 72 | 72 |
| | | Jf/Jr [-] | 0.6 | 0.4 | 0.5 | 0.4 | 0.3 | 0.2 |
| | | Df/Dr [-] | 1.0 | 1.0 | 1.0 | 1.0 | 1.0 | 1.0 |
| | | θr − θf [°] | 0 | 0 | 0 | 0 | 0 | 0 |
| | | Ride comfort | 3.1 | 3.2 | 3.4 | 3.4 | 3.6 | 3.6 |
| | | Stability | 3.6 | 3.6 | 3.6 | 3.6 | 3.6 | 3.6 |
| | | Cornering performance | 2.7 | 2.7 | 2.7 | 2.7 | 2.7 | 2.7 |
| | | Steering stability | 9.4 | 9.5 | 9.7 | 9.7 | 9.9 | 9.9 |
| | | Durability | 100 | 100 | 100 | 100 | 100 | 100 |
| | | Water pressure resistance fracture strength | 100 | 100 | 100 | 98 | 98 | 95 |

As shown in Tables 1 and 2, it is confirmed that the tire pair of each Example can contribute to improving ride comfort and ensuring stability. From the evaluation results, advantages of the present invention are clear.

INDUSTRIAL APPLICABILITY

The above-described technology that is able to contribute to improving ride comfort and ensuring stability can also be applied to tire pairs for various motorcycles.

REFERENCE SIGNS LIST 2 front tire
4, 54 tread
8, 58 bead
10, 60 carcass
14, 64 band
24, 26, 28, 74, 76, 78 carcass ply
30, 80 carcass cord
34, 84 band cord
38 strip
52 rear tire

The invention claimed is:

1. A motorcycle tire pair comprising a front tire and a rear tire, wherein
each of the front tire and the rear tire includes a pair of beads, a carcass extending on and between a first bead and a second bead, a tread located outward of the carcass in a radial direction, and a band located between the tread and the carcass in the radial direction,
the carcass includes a large number of carcass cords aligned with each other and each tilted relative to an equator plane,
the band includes a band cord extending substantially in a circumferential direction,
a ratio of a bending stiffness of the band cord of the front tire to a bending stiffness of the band cord of the rear tire is not less than 0.0 and less than 0.7, and
the density of the band cord in the band of the front tire is higher than a density of the band cord in the band of the rear tire.

2. The motorcycle tire pair according to claim 1, wherein
the bending stiffness of the band cord of the front tire is less than 15.0 g·cm, and
the bending stiffness of the band cord of the rear tire is not less than 15.0 g·cm and not greater than 40.0 g·cm.

3. The motorcycle tire pair according to claim 1, wherein the band cord of the front tire is a cord formed from an aramid fiber, and the band cord of the rear tire is a steel cord.

4. The motorcycle tire pair according to claim 1, wherein an angle of the carcass cords of the front tire with respect to the equator plane is smaller than an angle of the carcass cords of the rear tire with respect to the equator plane.

5. The motorcycle tire pair according to claim 4, wherein
the angle of the carcass cords of the front tire with respect to the equator plane is not less than 20° and less than 70°, and
the angle of the carcass cords of the rear tire with respect to the equator plane is not less than 70°.

6. The motorcycle tire pair according to claim 4, wherein a difference between the angle of the carcass cords of the rear tire with respect to the equator plane and the angle of the carcass cords of the front tire with respect to the equator plane is not less than 5° and not greater than 25°.

7. The motorcycle tire pair according to claim 1, wherein a ratio of the density of the band cord in the band of the front tire to the density of the band cord in the band of the rear tire is not less than 1.1 and not greater than 1.4.

8. The motorcycle tire pair according to claim 7, wherein the density of the band cord in the band of the rear tire is not less than 30 ends/5 cm and not greater than 50 ends/5 cm.

* * * * *